Feb. 10, 1970  T. A. CARTER, JR  3,494,291
BEARING ASSEMBLY
Filed Oct. 13, 1967
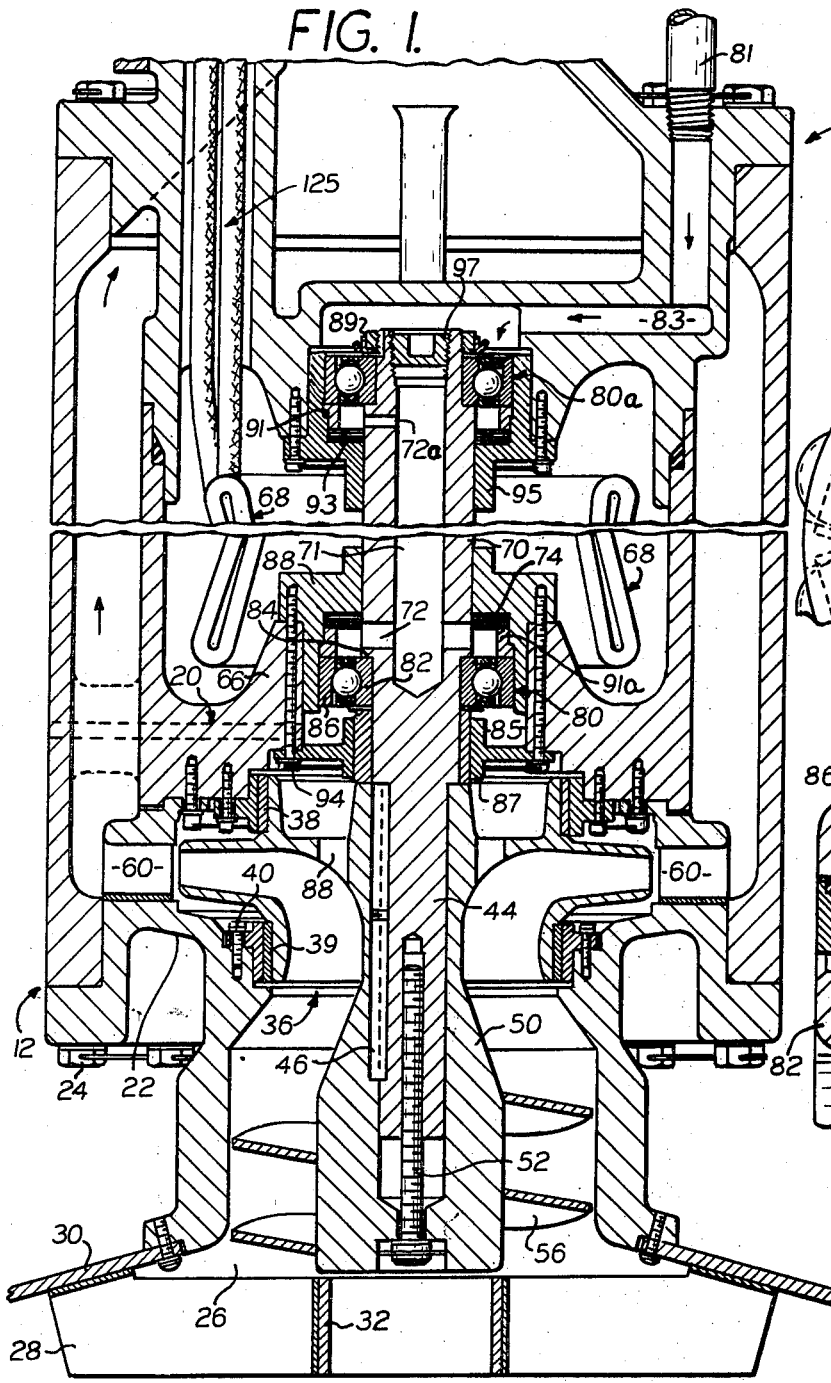
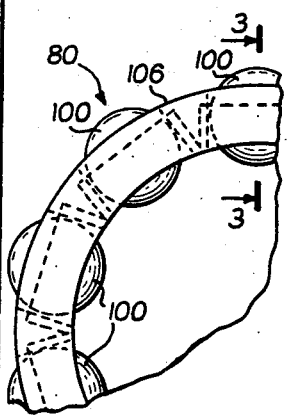
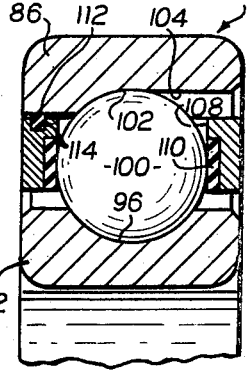
INVENTOR
THOMAS A. CARTER, JR.
BY  F.B. Henry
ATTORNEY

United States Patent Office 3,494,291
Patented Feb. 10, 1970

3,494,291
BEARING ASSEMBLY
Thomas A. Carter, Jr., Whittier, Calif., assignor to Air Reduction Company, Incorporated, New York, N.Y., a corporation of New York
Filed Oct. 13, 1967, Ser. No. 675,213
Int. Cl. F04d *13/02;* F16c *19/20, 33/38*
U.S. Cl. 103—87                                           20 Claims

ABSTRACT OF THE DISCLOSURE

This invention relates to an improved bearing assembly which is especially suited for use in a submerged pump. This invention comprises a ball bearing construction in which a riding ring with self-lubricating characteristics is positioned between a ball retainer and the outer race. Inserts made of self-lubricating material are positioned in the retainer spaces which hold the ball bearings. The material used for both the riding ring and the inserts is preferably bronze-filled Teflon.

BRIEF DESCRIPTION OF THE INVENTION

The invention relates to a cryogenic liquid pump with a special anti-friction bearing that is especially suited for the pumping of cryogenic liquids from storage vessels or tanks. The ball bearing construction comprises a subcombination of the invention.

Submerged pumps are often used for the transfer of cryogenic liquid from the hold of a ship to a storage vessel on shore. Conventional submersible pumps which employ bearing seals and bearings lubricated with standard lubricants such as oil and grease have been found to be unreliable when they have been used for this purpose. The nature of the fluid being pumped and its extremely low temperature adversely affects the bearings of the conventional pumps. The low temperature may cause the bearing lubricant to freeze and may also adversely affect the operation of the seals along the motor shaft. Furthermore, the extreme temperature changes which such pumps undergo cause expansions and contractions in the bearing parts which conventional pumps cannot tolerate.

The pump and bearing construction which is the subject of this disclosure constitutes a major step forward in the art in that the construction eliminates the need for separate lubricants for the bearings and further eliminates the seals which are used with conventional bearings. The bearings in my construction are continuously lubricated with the fluid being pumped. Portions of the bearing construction are made of self-lubricating materials which insure long bearing life. Other portions are made of high heat conducting material so that heat dissipation is prompt. The unique combination of materials results in a bearing which is especially suitable for use in a cryogenic environment.

Accordingly, the objects of the invention are:
(1) To provide an improved pump assembly which employs bearings lubricated with the fluid being pumped.
(2) To provide in a pump a bearing construction which does not employ seals.
(3) To provide a bearing construction which uses self-lubricating materials in a unique manner.
(4) To provide a bearing construction which uses self-lubricating materials (relatively poor heat conductors) and other materials which are good heat conductors in a novel manner so that the bearing may be successfully used over a wide temperature range.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views:
FIGURE 1 is a fragmentary sectional view of the cryogenic pump assembly made in accordance with this invention;
FIGURE 2 is a fragmentary, enlarged, plan view of a part of the anti-friction bearing shown on the pump of FIGURE 1; and
FIGURE 3 is a greatly enlarged sectional view taken on the line 3—3 of FIGURE 2 with the races shown.

DETAILED DESCRIPTION OF THE INVENTION

The cryogenic pump assembly shown in FIG. 1 of the drawing includes an upper housing 10 and a lower housing 12 which are secured together by means of a ring of screws 24. The lower housing 12 includes a pump housing 22 having an inlet opening 26 which allows the fluid being pumped to enter the pump. In order to make this inlet opening 26 an anti-vortex inlet, there are splitter vanes 28 attached to a flange 30 around the lower end of the opening 26. These splitter vanes are at angularly spaced locations around a center sleeve 32 to which the inner ends of the splitter plates are connected. The outer ends of the plates 28 are connected with the flange 30.

There is an impeller 36 between the lower housing and portion 20 of the upper housing. The impeller has a pair of wear rings 38, 39, which lay adjacent to wear rings fixed to the housing. The wear rings limit the recirculated flow from the pump discharge side to the pump suction side.

The impeller 36 is secured to a shaft 44 by key 46. The shaft 44 extends somewhat below the end of the impeller 36, and inducer 50 is mounted on the lower end of the shaft 44 by a bolt 52. The bolt 52 holds the impeller and the inducer on the shaft. On the circumference of the inducer 50 there is a helical inducer vane 56 which is integral with the hub 50 and which serves to draw liquid up through the opening 26 into contact with the impeller 36.

The impeller 36 discharges liquid through the diffuser vane 60 bolted to the upper housing and located between the portion 20 and the pump housing 22 of the lower housing 12. This liquid flows from the chamber 60 through an annular outlet 62 in the housing 10. The liquid is directed upwardly to the top of housing 10 and is then fed into an appropriate conduit system.

The portion 20 has an opening through which motion-transmitting means extend for connecting an electric motor 68 with the impeller 36. These motion-transmitting means include the shaft 44 which is shown in the drawing as being an extending part of an armature shaft 70. This shaft 70 is hollow 71 for a portion of its length and is provided with openings 72, 72a, for a circulation of cryogenic liquid through the bearings. A portion of the fluid that is pumped is returned to the pump bearings in order to lubricate and cool the same. The fluid is tapped from the discharged line and directed through appropriate conduits to connection 81. The fluid may be transmitted through suitable filters in order to insure the fluid does not carry impurities to the bearings. The filters may be mounted on the pump or be a considerable distance from the pump and be connected to it by conduits. The fluid entering connection 81 is directed through an internal conduit 83 into upper bearing unit 80a. The fluid passes through the bearing and flows through ports 72a into the internal opening 71 in the shaft. The fluid exits from said opening through ports 72 and passes through the lower bearing unit 80 into space 85. The fluid then passes throttle bushing 87 and flows through ports 88 in the impeller 36 and joins the mainstream of fluid being pumped.

The bearings which form a major part of the invention and which will be described in detail below are located in the pump in the following manner. The inner race of the upper bearing unit 80a is mounted on the shaft and is locked thereon by means of lock washer and nut 89. The outer race rests against a spacer 91 and is preloaded by Belleville spring 93. The spring abuts against an upper bearing cap 95 which is bolted to the pump housing. A plug 97 is screwed into the end of the shaft to seal the same.

The lower bearing 80 is mounted in a similar manner. The Belleville spring rests against the lower bearing cap 88 and transmits a pre-load force to the bearing through spacer 91a. The inner race 82 is mounted on the shaft and rests against lip 84. The outer race 86 is housed in the bearing cap 88 which is bolted to the pump housing by bolts 94. The bearings are preloaded in an opposite direction in the manner shown in order to compensate for upthrust and downthrust on the shaft.

The construction of the anti-friction bearing is shown in FIGURES 2 and 3. The inner race 82 has a groove 96 with a transverse curvature slightly larger than the curvature of the circumference of balls 100 located between the races 82 and 86. There is a half-groove 102, of slightly larger curvature than the curvature of the circumference of the balls 100. One side of the half-groove 102 is cut away to leave a clearance 104 for initial assembly of the balls 100 with the races 82 and 86.

The balls 100 are held in angularly spaced relation to one another by a retainer 106 having a separate opening 108 for each of the balls 100. Each of the openings 108 has an insert 110 which lines the portion of the opening 108 with which the ball comes in contact. The inside surface of each opening 108 is preferably cylindrical and the diameter of the cylinder is sufficiently greater than the diameter of the ball 100 to permit the ball to rotate freely in the retainer 106 as the balls roll around the races.

In order to reduce friction, a ring 112 is provided for preventing the retainer 106 from touching the race 86. This ring 112 is located between the retainer 106 and a cylindrical surface of the outer race 86.

The rider ring 112 is preferably located in a circumferential groove 114 in the ball retainer 106 at a location axially spaced from the openings 108 and from the race groove 102. The ring 112 is made of material having a low coefficient of friction. Although other materials can be used, the preferred material for the ring 112 is bronze-filled polymerized tetrafluoroethylene (Teflon 40–60). This material preferably contains Teflon with bronze powder dispersed through the Teflon, the proportion of Teflon to bronze being 40 to 60 by weight.

The ball retainer 106 is preferably made of aluminum because of its high thermal conductivity. The outer race, inner race and the balls are preferably made of hardenable stainless steel. The inserts are preferably made of the same material as the rider ring 112, that is bronze-filled Teflon. The bronze-filled Teflon is a relatively poor heat conductor, when compared with aluminum, for example, and the amount of this material used is therefore kept to the minimum required for good operation. For example, the thickness (a) of the inserts 110 is preferably less than half the thickness (b) of the retainer 108. The bronze-filled Teflon is used in the bearing where sliding contact takes place and its self-lubricating characteristics reduces friction and provides for long bearing life.

As stated above, the ball retainer 106 is made of aluminum which is light and readily dissipates heat. The design takes advantage of the best characteristics of each of the three materials (steel, aluminum, self-lubricating material) and this results in an extremely reliable and long lived bearing.

Reference number 125 indicates generally the electrical leads and connectors used for bringing power to the motor. The mechanism for raising and lowering the illustrated pump from the storage tank is not shown and need not be described since it forms no part of this invention.

The bearing assembly which has been described in some detail is especially suited for use in a submersible pump for cryogenic fluids. This assembly may, however, be used in other types of pumps and in other types of environments in which conventional bearing construction and lubrication proves unsatisfactory.

The preferred embodiment of the invention has been illustrated and described, but changes and modifications can be made and some features can be used in different combinations without departing from the invention as defined in the claims.

What is claimed is:

1. In a pump assembly, a pump housing, an impeller in said housing, an opening in said housing communicating with said impeller, a motor in said housing connected to said impeller by shaft means, anti-friction bearing means supporting said shaft means in the housing, said bearing means comprising an outer race, an inner race, a plurality of ball bearings between said races, a ball retainer holding the balls in angularly spaced relation to one another between said races and rider means of self-lubricating material concentric with said shaft means and disposed between and in contacting relationship with said outer race and said retainer so that said retainer does not contact said outer race.

2. The pump assembly described in claim 1 characterized by the rider means being made of plastic material with a powder of other lubricating material dispersed through the plastic material.

3. The pump assembly described in claim 1 characterized by the rider means being made of bronze-filled polymerized tetrafluoroethylene.

4. The pump assembly described in claim 1 in which self-lubricating inserts are positioned between the ball bearings and the ball retainer so that the balls do not directly contact said retainer.

5. The pump assembly described in claim 4 in which said inserts are made of plastic material with a powder of other lubricating material dispersed through the plastic material.

6. The pump assembly described in claim 1 characterized by the outer race and the retainer having confronting cylindrical faces between which the rider means is located, at least one of the confronting cylindrical faces having a lip thereon for preventing axial movement of the rider means.

7. The pump assembly described in claim 1 characterized by the outer race and the retainer having confronting cylindrical faces between which the rider means is located, one of the confronting cylindrical faces having a circumferential groove therein, and the rider means being located in the groove but being of greater radial extent than the depth of the groove so that a portion of the rider means extends radially beyond the groove and into contact with the other confronting face.

8. The pump assembly described in claim 1 in which said bearing means includes a pair of bearing units.

9. The pump assembly described in claim 1 in which the retainer is made of aluminum and the races are made of stainless steel.

10. The pump assembly described in claim 5 in which the inserts are made of bronze-filled polymerized tetrafluoroethylene.

11. A bearing assembly including inner and outer races and balls between the races, a retainer with radial openings therethrough at angularly spaced locations for holding the balls angularly spaced from one another, and rider means composed of a substantially rigid material having a low coefficient of friction for preventing the retainer from contacting the races concentric with the races and positioned between and contacting an annular face on the retainer and an annular face on one of the races.

12. The bearing assembly described in claim 11 characterized by the rider means being made of plastic material with a powder of other lubricating material dispersed therethrough, and a lip on at least one of the faces for restraining the rider means against axial movement.

13. The bearing assembly described in claim 11 characterized by the rider means comprising a ring made of bronze-filled polymerized tetrafluoroethylene, a groove in one of the faces, the ring being within the groove and having a greater radial dimension than the depth of the groove and extending out of the groove into contact with the other face.

14. The bearing assembly described in claim 11 characterized by the inner and outer races being made of hardenable stainless steel, with the inner race having a groove with a transverse radius of curvature slightly greater than the radius of the balls and in which the balls run, the outer race having at least a partial groove in which the balls run, said balls being made of steel, said retainer being made of aluminum with cylindrical openings for receiving the balls, inserts lining the openings and contacting the balls, said inserts and the rider means being made of bronze-filled polymerized tetrafluoroethylene, and a circumferential groove in the annular face of the retainer, axially spaced from the grooves in which the balls run, the rider means being within the groove and having a height greater than the depth of the groove and extending out of the groove into contact with an annular face on the outer race.

15. A bearing assembly including inner and outer races and balls between the races, a retainer with radial openings therethrough at angularly spaced locations around the bearing for holding the balls angularly spaced from one another, self-lubricating inserts positioned between said balls and the retainer so that said balls do not directly contact the retainer, a rider ring positioned between and contacting an annular face on said retainer and an annular face on one of said races, said ring being concentric with said races and being made of self-lubricating material, and means to prevent said rider ring from moving axially.

16. The bearing assembly described in claim 15 in which the inserts are made of bronze-filled polymerized tetrafluoroethylene.

17. The bearing assembly described in claim 11 in which self-lubricating inserts are positioned between the balls and the retainer so that the balls do not directly contact the retainer.

18. The bearing assembly described in claim 15 in which the thickness of an insert is less than one half the thickness of the retainer.

19. The bearing assembly described in claim 15 in which the rider ring is made of bronze-filled polymerized tetrafluoroethylene.

20. A bearing assembly including inner and outer raceways and rolling elements between the raceways, a retainer with openings therethrough at angularly spaced locations for holding the rolling elements angularly spaced from one another, and rider means composed of a ring of self-lubricating material disposed between and in contacting relationship with said retainer and at least one raceway, said retainer and said at least one raceway having confronting faces between which the rider means is located, at least one of the faces having a recess means therein to receive said rider means and position the same.

References Cited

UNITED STATES PATENTS

| 2,557,476 | 6/1951 | Schwitter | 308—201 |
| 2,845,311 | 7/1958 | Cobb | 308—216 |
| 2,975,008 | 3/1961 | Ruley | 308—201 |
| 3,369,715 | 2/1968 | Carter. | |
| 3,390,928 | 7/1968 | Davies et al. | 308—201 |

FOREIGN PATENTS

| 1,079,901 | 10/1957 | Germany. |
| 1,387,281 | 12/1964 | France. |
| 880,548 | 6/1953 | Germany. |

MARTIN P. SCHWADRON, Primary Examiner

FRANK SUSKO, Assistant Examiner

U.S. Cl. X.R.

308—201